US011212375B2

(12) United States Patent
Rahardjo et al.

(10) Patent No.: US 11,212,375 B2
(45) Date of Patent: Dec. 28, 2021

(54) SYSTEM AND METHOD TO PROVIDE HETEROGENEOUS PROTOCOLS ON NETWORK INTERFACE DEVICES

(71) Applicant: DELL PRODUCTS, LP, Round Rock, TX (US)

(72) Inventors: Johan Rahardjo, Austin, TX (US); Joshua David Anderson, Round Rock, TX (US); Jeremiah James Bartlett, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 210 days.

(21) Appl. No.: 16/540,475

(22) Filed: Aug. 14, 2019

(65) Prior Publication Data

US 2021/0051217 A1 Feb. 18, 2021

(51) Int. Cl.
*H04L 29/06* (2006.01)
*H04L 12/26* (2006.01)
*H04L 9/08* (2006.01)

(52) U.S. Cl.
CPC ............ *H04L 69/18* (2013.01); *H04L 9/0825* (2013.01); *H04L 43/50* (2013.01)

(58) Field of Classification Search
None
See application file for complete search history.

(56) References Cited

U.S. PATENT DOCUMENTS 6,160,806 A * 12/2000 Cantwell ............ H04L 12/6402 370/360
7,756,027 B1 * 7/2010 Reddy ................ H04L 41/0806 370/230
9,071,589 B1 * 6/2015 Patnala ................ H04L 9/0825
9,424,148 B2 8/2016 Brundridge et al.
9,734,015 B2 8/2017 Herzi et al.
9,846,617 B2 * 12/2017 Rahardjo ............. G06F 9/4406
2005/0256969 A1 * 11/2005 Yancey .............. G06F 13/4256 709/238
2007/0101242 A1 * 5/2007 Yancey .............. G06F 13/4256 714/776
2012/0177201 A1 * 7/2012 Ayling ................. H04L 9/0858 380/278
2012/0210165 A1 * 8/2012 Lambert .............. G06F 9/4416 714/15
2013/0007428 A1 * 1/2013 Khosrowpour ........ G06Q 30/00 713/1
2013/0111197 A1 * 5/2013 Nadon ................... G06F 9/451 713/1
2014/0086245 A1 * 3/2014 Viens ................... H04L 45/502 370/392

(Continued)

*Primary Examiner* — Nicholas Sloms
(74) *Attorney, Agent, or Firm* — Larson Newman, LLP

(57) ABSTRACT

A first add-in card is connected to a second add-in card via a network communication link using a first network protocol. The first add-in card determines that a first network interface device is directly connected to a second network interface device via the network communication link, and directs that the first and second network interface devices communicate via a second network protocol based upon the first network interface device being directly connected to the second network interface device via the network communication link. The second network protocol transmits a higher proportion of data than the first network protocol.

18 Claims, 5 Drawing Sheets

(56) References Cited

U.S. PATENT DOCUMENTS

| | | | | |
|---|---|---|---|---|
| 2014/0165183 | A1* | 6/2014 | Dharmadhikari | H04L 63/0227 726/13 |
| 2016/0055119 | A1* | 2/2016 | Egi | G06F 13/4282 710/313 |
| 2016/0112348 | A1* | 4/2016 | Meng | H04L 12/4641 370/389 |
| 2016/0149867 | A1* | 5/2016 | Lohr | H04L 63/0428 380/256 |
| 2017/0250802 | A1* | 8/2017 | Shimizu | H04L 9/0816 |
| 2017/0257214 | A1* | 9/2017 | Stufflebeam | H04L 9/088 |
| 2018/0175664 | A1* | 6/2018 | Wang | H02J 7/0068 |
| 2018/0196103 | A1* | 7/2018 | Champoux | G01R 31/31724 |
| 2018/0227200 | A1* | 8/2018 | Nara | H04L 43/0817 |
| 2019/0042518 | A1* | 2/2019 | Marolia | G06F 9/45558 |
| 2019/0259222 | A1* | 8/2019 | Wang | G06Q 20/085 |

* cited by examiner

SYSTEM AND METHOD TO PROVIDE HETEROGENEOUS PROTOCOLS ON NETWORK INTERFACE DEVICES

FIELD OF THE DISCLOSURE

This disclosure generally relates to information handling systems, and more particularly relates to providing heterogenous protocols on network interface devices.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. The use of the same reference symbols in different drawings indicates similar or identical items. Embodiments incorporating teachings of the present disclosure are shown and described with respect to the drawings presented herein, in which.

SUMMARY

An information handling system may include first and second add-in cards connected via a network communication link. The first and second add-in cards may be configured to communicate via a first network protocol. The first add-in card may determine that the first network interface device is directly connected to the second network interfaced device via the network communication link, and may direct that the first and second network interface devices communicate via a second network protocol based upon the first network interface device being directly connected to the second network interface device via the network communication link. The second network protocol may transmit a higher proportion of data than the first network protocol.

DETAILED DESCRIPTION OF DRAWINGS

The following description in combination with the Figures is provided to assist in understanding the teachings disclosed herein, and will focus on specific implementations and embodiments of the teachings. This focus is provided to assist in describing the teachings, and should not be interpreted as limiting the scope or applicability of the teachings. Moreover, other teachings can be used along with the teachings of this disclosure, and the teachings of this disclosure can be used along with other disclosures.

Figure 1:
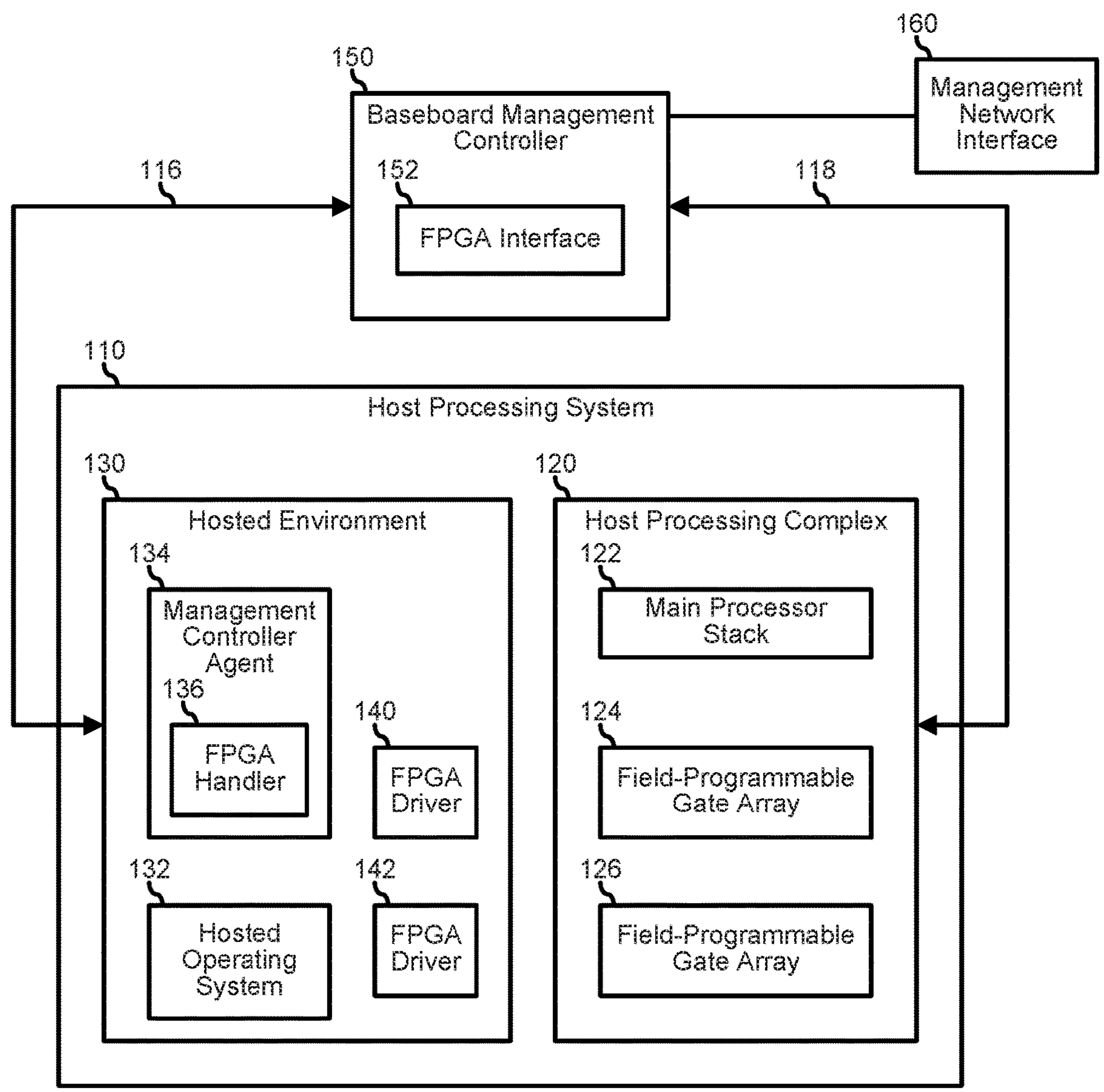
FIG. 1 is a block diagram of an information handling system including field-programmable gate arrays (FPGAs) according to an embodiment of the present disclosure.

FIG. 1 illustrates an information handling system 100 including a host processing system 110, a baseboard management controller (BMC) 150, and a management network interface 160. Host processing system 110 includes a host processing complex 120 and a hosted environment 130. Host processing complex 120 represents the main processing elements of information handling system 100, including a main processor stack 122, and field-programmable gate arrays (FPGAs) 124 and 126. Main processor stack 122 represents hardware including one or more processors, chipset elements, storage devices, memory devices, I/O devices, and the like. FPGAs 124 and 126 represent processing resources of host processing complex 120 that can be utilized to offload main processor stack 122 from various functions as needed or desired.

Hosted environment 130 includes a hosted OS 132, a BMC agent 134, and FPGA drivers 140 and 142. Hosted environment 130 represents a processing environment instantiated in code on host processing complex 120, and can include a BIOS or UEFI for information handling system 100, other firmware, device drivers, and the like, that establish the core operating code for establishing the hosted environment, and to launch hosted OS 132 on the host processing complex. Hosted OS 132 operates to manage the runtime aspects of hosted environment 130, to launch programs and applications on host processing complex 120, and to launch, manage, maintain, and halt tasks on FPGAs 124 and 126. FPGA drivers 140 and 142 operate to control FPGAs 124 and 126, and to provide an interface to enable hosted OS 132 and other components of hosted environment 130 to access the FPGAs. In a particular embodiment, one or more of FPGAs 124 and 126 include vendor specific functions and features for configuring, monitoring, and controlling the FPGAs. Such vendor specific functions and features are accessible to hosted environment 130 via FPGA drivers 140 and 142.

BMC 150 is connected via an interface 116 to interact with various functions and features of hosted environment 130, and is connected via an out-of-band interface 118 to interact with various functions and features of host processing complex 120. In particular, BMC 150 interacts with the various functions and features of hosted environment 130 via a management system agent 134 that is instantiated in the hosted environment to permit a user connected to the BMC to obtain status information from the pre-boot and runtime elements of the hosted environment, including the programs and applications instantiated in the hosted environment. The user can also provide commands and otherwise control the operations of the programs and applications, including directing hosted OS 132 to launch a program, application, or task, to modify the runtime operation of a program, application, or task, and to halt the execution of a program, application, or task, as needed or desired. Interface 116 represents a communication path between hosted environment 130 and BMC 150, as is known in the art, and can include a keyboard controller style (KCS) interface, a USB-NIC interface, an OS-to-BMC pass-through interface, or the like.

BMC 150 includes an FPGA interface module 152 that interacts with the various in-band functions and features of FPGA drivers 140 and 142 via an FPGA handler module 136 of management system agent 134 to permit the user to obtain status information from the tasks instantiated on FPGAs 124 and 126, and to access the in-band monitoring features of the FPGAs. FPGA interface module 152, interacting with FPGA handler module 136 also permits the user to provide commands and otherwise control the operations of FPGAs 124 and 126 or to manage the tasks running on the FPGAs, including directing hosted OS 132 to launch a task, to modify the runtime operation of a task, and to halt the execution of a task, as needed or desired.

BMC 150 also interacts out-of-band with the various functions and features of host processing complex 120. In particular, FPGA interface module 152 interacts out-of-band with FPGAs 124 and 126. For example, FPGA interface module 152 can receive out-of-band status information from FPGAs 124 and 126. Note that the status information that is available from FPGAs 124 and 126 via out-of-band interface 118 may be the same as, or different from the status information that is available from FPGA drivers 140 and 142, as may be determined by the particular FPGA vendor, or as otherwise dictated by design related choices, as needed or desired.

FPGA interface module 152 provides a management interface that permits a user that is connected to BMC 150 via management network interface 160 to select one or more of FPGAs 124 and 126, and to view the current operating status of the selected FPGA, such as by identifying the tasks currently being run on the selected FPGA, or the like, or by otherwise displaying information related to the status of the selected FPGA. Here, FPGA interface module 152 directs FPGA handler module 136 to retrieve the requested information from hosted environment 130, from hosted OS 132, or directly retrieves the requested information from the selected one of FPGAs 124 and 126 via out-of-band interface 118. FPGA interface module 152 then provides the retrieved information to the user.

Figure 2:
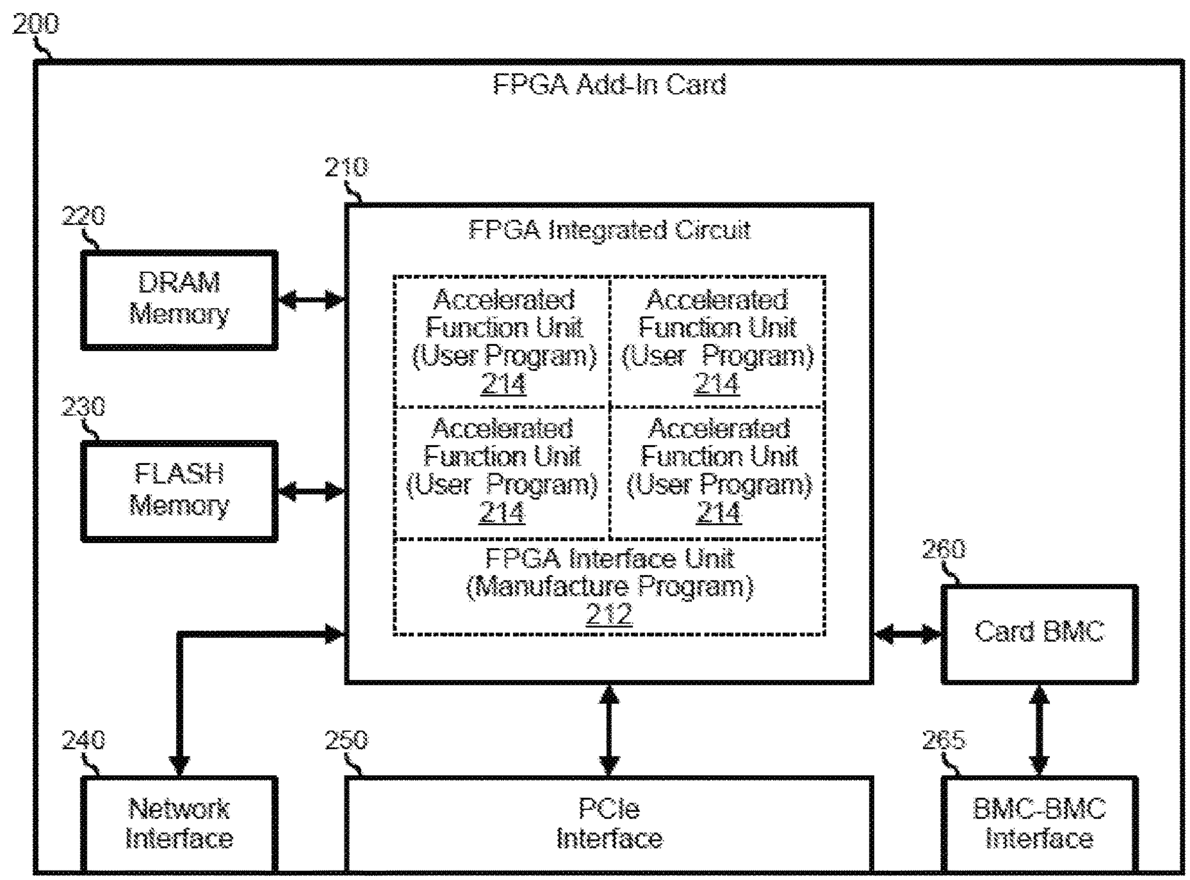
FIG. 2 is a block diagram of an FPGA add-in card according to an embodiment of the present disclosure.

FPGAs are increasingly being utilized as high performance accelerators in various server applications, where a typical server may employ one or more FPGAs. FIG. 2 illustrates an FPGA add-in card 200 that can be plugged into a communication interface of a server system. FPGA add-in card 200 includes an FPGA integrated circuit 210, one or more Dynamic Random Access Memory (DRAM) devices 220, one or more FLASH memory device 230, a network interface 240, a PCIe interface 250, a card BMC 260, and a BMC-to-BMC interface 265. FPGA add-in card 200 provides the functions and features of an FPGA, but packaged so as to be easily incorporated into the architecture of an information handling system. FPGA integrated circuit 210 represents an FPGA device that is configured to provide hardware acceleration for various types of processing task and that is flexible to be configured to perform its intended processing tasks.

DRAM memory device 220 represents a volatile memory device that is accessible for storage of data to be consumed by, or produced by FPGA integrated circuit 210 or other functions of FPGA add-in card 200. Flash memory device 230 represents a non-volatile memory device for storing firmware for FPGA add-in card 200 and for storing other configuration information related to the FPGA add-in card. Network interface 240 represents a port for connecting to a network external to the information handling system into which FPGA add-in card 200 is installed. An example includes an Ethernet network, a Fibre Channel network, or another network, as needed or desired. In a particular embodiment, network interface 240 represents one or more Quad Small Form-Factor Pluggable (QSFP) modules. PCIe interface 250 represents a high-speed serial data interface in accordance with a PCIe specification. An example of PCIe interface 250 includes a four-lane (x4) link, an eight-lane (x8) link, a 16-lane (x16) link, or a link with another number of lanes as needed or desired. PCIe interface 250 represent a main data communication link between FPGA add-in card 200 and the information handling system into which the FPGA add-in card is installed for interacting with the programs and software instantiated in an operating system of the information handling system to perform the processing tasks as described below. Card BMC 260 represents a processor or controller of FPGA add-in card 200 for the monitoring, management, and maintenance of the functions and features of the FPGA add-in card. Card BMC 260 can operate in accordance with an Intelligent Platform Management Interface (IPMI) to provide the monitoring, managing, and maintaining of the functions and features out-of-band from an operating system instantiated on an information handling system into which FPGA add-in card 200 is installed. Here, card BMC 260 will typically be part of a management network of the information handling system that includes a BMC for the information handling system. Hence card BMC 260 will be connected to the system BMC via BMC-to-BMC interface 265. Thus BMC-to-BMC interface 265 operates to couple card BMC 260 to a management network of the information handling system for out-of-band communication between the card BMC and the elements of the information handling system. Examples of an management network interface may include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on the information handling system, that is apart from the execution of code by processors of the information handling system and procedures that are implemented on the information handling system in response to the executed code.

FPGA integrated circuit 210 executes FPGA Interface Unit (FIU) program 212, which is provided by the manufacturer of the FPGA integrated circuit of FPGA add-in card 200 and one or more Accelerated Function Unit (AFU) 214, which is provided by a user of the information handling system into which FPGA add-in card 200 is installed. The FIU 212, also referred to as the "Blue Bit Stream" where FPGA add-in card 200 represents an FPGA add-in card manufactured by Intel Corp., provides a platform interface layer between FPGA integrated circuit 210 and the other interfaces of FPGA add-in card 210, such as DRAM device 220, FLASH memory device 230, network interface 240, PCIe interface 250, and card BMC 260. The AFUs, also referred to as the "Green Bit Streams" where FPGA add-in card 200 represents an FPGA add-in card manufactured by Intel Corp., provide the user intellectual property (IP) that uniquely programs FPGA integrated circuit 210 to perform the intended processing tasks. FIU 212 is pre-configured at the time of manufacture, and, with the exception of periodic firmware updates from the manufacturer of FPGA add-in card 200, is intended to stay unchanged during the lifetime of the FPGA add-in card. On the other hand, the AFUs are meant to be programmed in accordance with the desired processing task to be performed by FPGA add-in card 200. Hence FPGAs are referred to as being "field programmable." In this regard, the AFUs may be programmed to FPGA integrated circuit 210 during a system boot process of the information handling system into which FPGA add-in card 200 is installed, or during run time on an operating system instantiated on the information handling system, and FPGA integrated circuit 210 can be reprogrammed with different AFUs as needed or desired during the run time.

Figure 3:
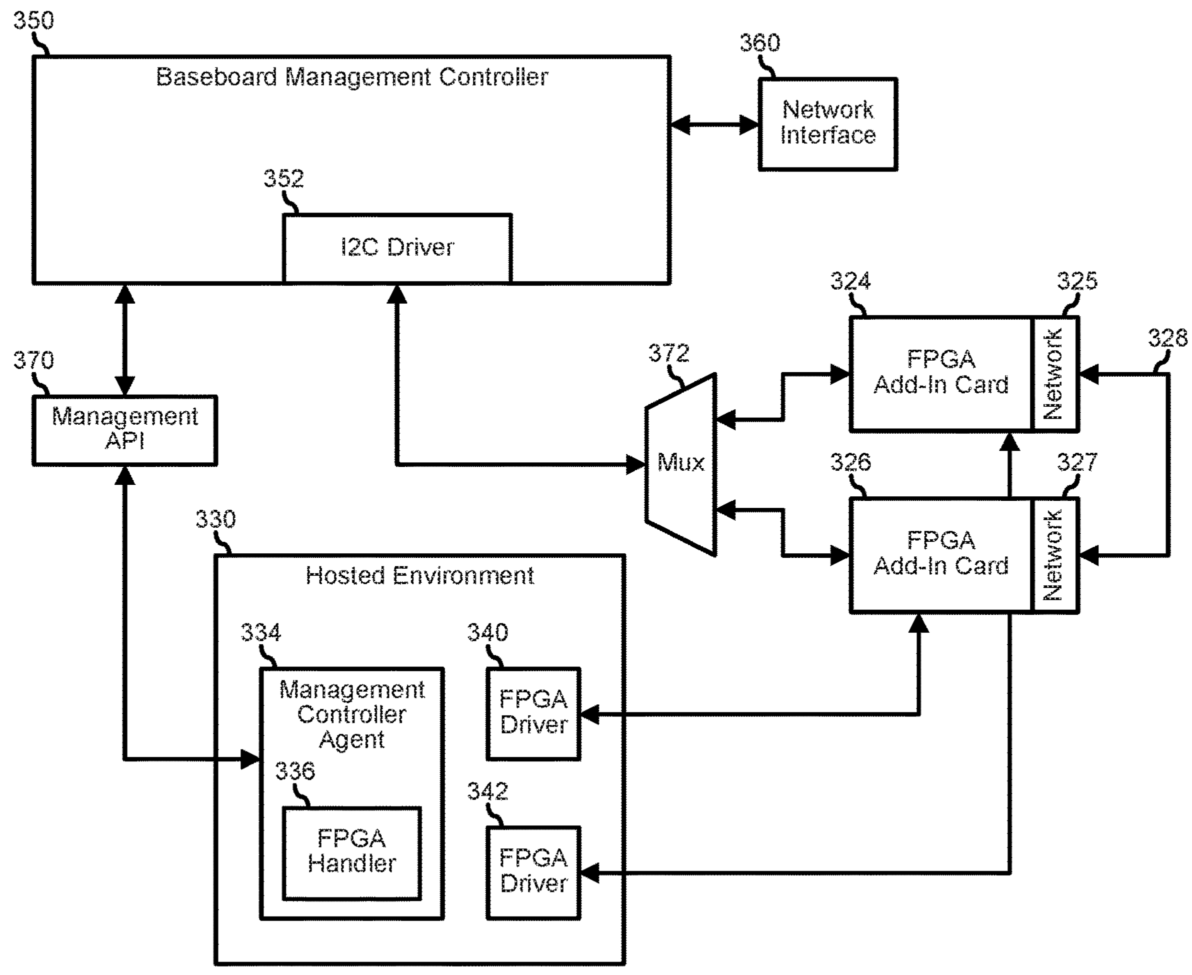
FIG. 3 is a block diagram detailing application and software level components of an information handling including FPGA add-in cards according to an embodiment of the present disclosure.

FIG. 3 illustrates an information handling system 300 similar to information handling system 100, with emphasis on software and application level components for managing FPGAs 200. Here, information handling system 300 is illustrated as including a hosted environment 330 similar to hosted environment 130, FPGA add-in cards 324 and 326 similar to FPGAs 124 and 126 and to FPGA add-in card 200, a BMC 350 similar to BMC 150, a management network interface 360 similar to management network interface 160, a manageability application program interface (API) 370, and an Inter-Integrated Circuit ($I^2C$) multiplexor 372. Hosted environment 330 includes management controller agent 334 similar to management controller agent 134, and FPGA drivers 340 and 342 similar to FPGA drivers 140 and 142. Management controller agent 334 includes FPGA handler 336 similar to FPGA handler 136. BMC 350 includes an $I^2C$ driver 352.

FPGA drivers 340 and 342 operate to control FPGA add-in cards 324 and 326, and to provide an interface to enable a hosted OS and other components of hosted environment 330 to access vendor specific functions and features for configuring, monitoring, and controlling the FPGAs, including programming the FPGA add-in cards with the AFUs needed to perform the desired processing tasks. Here, FPGA drivers 340 and 342 operate in-band with the operations of hosted environment 330, for example via PCIe interfaces to FPGAs 324 and 326.

BMC 350 is connected via manageability API 370 to interact with various functions and features of hosted environment 330. As such, manageability API 370 represents a standards-based communication API that provide a uniform set of functions and features for the management of a hosted environment by BMC 350. An example of manageability API 370 includes a Redfish API in accordance with a Redfish Standard published by the Distributed Management Task Force (DMTF), or another API configured to manage communications between a hosted environment and a BMC. In a particular embodiment, BMC 350 operates via manageability API 370 to access the various in-band functions and features of FPGA drivers 340 and 342 to permit the user to access the in-band monitoring features of the FPGAs, as described above.

BMC 350 is connected via $I^2C$ driver 352 to $I^2C$ multiplexor 372 to interact out-of-band with FPGAs 324 and 326. For example, BMC 350 can receive out-of-band status information from FPGAs 324 and 326, such as the number and type of AFUs that are operating on FPGA add-in cards 324 and 326, and the like. In a particular embodiment, BMC 350 operates to program FPGA add-in cards 324 and 326 with the AFUs needed to perform the desired processing tasks. In particular, BMC 350 operates to determine the number and type of AFUs that are programmed onto FPGA add-in cards 324 and 326 by providing a Platform Level Data Model (PLDM) command to the FPGA add-in cards via I2C driver 352. Once BMC 350 has received the number and type of the AFUs programmed onto FPGA add-in cards 324 and 326, the BMC operates to select one or more of the AFUs to enable or to disable, and sets up the FPGA add-in cards to modify or change the programming associated with one or more of the disabled AFUs. Here, BMC 350 operates to provide a PLDM command to FPGA add-in cards 324 and 326 via I2C driver 352 to set up the FPGA add-in cards to receive the new or modified AFUs and to program the FPGA add-in cards with the new or modified AFUs.

In contrast to the programming of FPGA add-in cards 324 and 326 from hosted environment 330, that is, via FPGA drivers 340 and 342, the programming of the AFUs in the FPGA add-in cards via BMC 350 provides several advantages. As a first matter, programming of the AFUs in FPGA add-in cards 324 and 326 via BMC 350 permits a one-to-many approach to managing AFUs and the associated processing tasks on a datacenter level. Here, a management system connected to BMC 350 via management network interface 360 can update multiple information handling systems similar to information handling system 300 without interrupting the hosted environments of instantiated on the information handling systems, and thereby leaving the hosted environments free to perform the desired processing tasks without consuming processing bandwidth of the hosted environments.

FPGA add-in card 324 includes a network interface device 325 and FPGA add-in card 326 includes a network interface device 327. Network interface devices 325 and 327 operate to implement a particular network fabric, such as an Ethernet fabric, a FibreChannel fabric, or the like, and are connected together to provide a direct network communication link 328 between FPGA add-in cards 324 and 326. In this way, FPGA add-in cards 324 and 326 can process data faster than if all communications between the FPGA add-in cards were to be provided via hosted environment 330. Further, by providing network communication link 328 between FPGA add-in cards 324 and 326, the processing resources of hosted environment 330 are not consumed in handling the passing of data between the FPGA add-in cards. For example, where FPGA add-in cards 324 and 326 operate to provide a highly serialized and repetitive processing task, the FPGAs of the FPGA add-in cards can each be programmed with multiple AFUs to perform the processing task, and providing the output data from a first AFU to a next AFU, and so on until each AFU in a first FPGA add-in card has processed the data. Then, if more repetitions of the processing task are needed, the data can be passed directly from the first FPGA add-in card to a next FPGA add-in card via network communication link 328 for further processing by the next FPGA add-in card. Note that a typical network connection link between network interface devices may include various connections to network routing or switching devices. However, here, it will be understood that network communication link 238 is a direct network communication link in that network interface device 235 is connected to network interface device 237 via a single network cable without being connected to any network routing or switching devices. It will be further understood that one or more of network interface devices 235 and 237 may include more than one network connection. Thus, for the purpose of the present disclosure, where an information handling system includes more than two FPGA add-in cards, direct network connection links may be established between the FPGA add-in cards in a daisy-chain configuration, or a ring configuration without any such direct network connections being connected to any network routing or switching device. Also, one or more other network connection of network interface devices 325 and 327 that are not utilized in making network communication link 328 may be connected to a network routing or switching device as needed or desired, to provide connectivity to a wider network fabric without violating the teachings herein.

In a particular embodiment, when one or more of network interface devices 325 or 327 detects the establishment of network communication link 328, the network interface devices operate to provide communications over the network communication link utilizing a modified network protocol that utilizes less data overhead and permits higher bandwidth communications between FPGA add-in cards 324 and 326. That is, when network communication link 328 is determined to be a direct network communication link, the network protocol is streamlined to a peer-to-peer protocol such that a greater proportion of the data communicated over the network communication link is data to be processes, and a smaller proportion of the data communicated over the network communication link is network protocol overhead. For example, where network interface devices 325 and 327 represent Ethernet network interface devices, the elaborate framing mechanism typically employed in the Ethernet protocol can be dispensed with because such framing information as source and destination MAC/IP addresses, tag information, destination service access point (DSAP) and source service access point (SSAP) information, and the like, may not be needed because the source of any date received by network interface device 325 is known to be network interface device 327, and vice versa. Thus, the framing may be limited to a truncated preamble, a length for the following data, a check sum for the data, and an inter-frame gap, thereby reducing the framing overhead. Other reductions in the framing overhead may be utilized as needed or desired.

In determining that network communication link 328 is a direct communication link, FPGA add-in cards 324 and 326 operate to communicate with hosted environment 330 to determine the identities of the devices of information handling system 300. For example, where FPGA add-in cards 324 and 326 are endpoints on one or more PCIe root complex, the FPGA add-in cards can receive the MAC/IP addresses associated with all of the endpoints and can match the endpoint MAC/IP addresses with the MAC/IP addresses to which they are connected via network communication link 328. If the MAC/IP addresses match, such as when network interface devices 325 and 327 are directly connected via network communication link 328, then that network communication link is determined to be a direct network communication link. Where a network communication link is connected to a network routing or switching device, then the MAC/IP address for that network communication link will not match any of the MAC/IP addresses of the endpoints of information handling system 300.

Further, once the direct nature of network communication link 328 is determined, network interface devices 325 and 327 operate to optimize the performance of the network communication link. Here, one of network interface devices 325 or 327 directs the other network interface device to provide a loopback mode, such that the initiating network interface device can characterize the network communication link in terms of cable length, propagation delay, attenuation, and the like, to determine a highest operating frequency that can be achieved on the network communication link. The operating initiating network interface device then directs the other network interfaced device to operate at that highest operating frequency, thereby further increasing the bandwidth of network communication link 328. Note that, in contrast, were network routing or switching devices present in the network communication link, the established operating frequency would likely be set at a lowest common operating frequency on the network. Note further that other methods of characterizing the highest operating frequency, such as Time Domain Reflectometry, or the like, may be utilized as needed or desired.

In a particular embodiment, because network communication link 328 is determined to be a direct network communication link, one of FPGA add-in cards 324 and 326 operates to provide an encryption scheme to be utilized for data communicated via the network communication link. In particular, because network communication link 328 is a direct network communication link, one of FPGA add-in cards 324 and 326 can provide a symmetric data encryption key to the other FPGA add-in card without fear of the data encryption key being intercepted. The data encryption key may be in accordance with a randomly generated encryption key and may include symmetric data encryption keys or asymmetric data encryption keys, as needed or desired.

Note that in the present illustrations, the direct network communication link is established between FPGA add-in cards, this is not necessarily so, and the teachings of the present disclosure, including the providing of a modified communication protocol, the determination that the network communication link is a direct network communication link, the optimization of the operating frequency over a direct network communication link, and the passing of data encryption keys via a direct network communication link, are not limited to direct network communication links between FPGA add-in cards, but may be applied whenever a direct network communication link is defined or utilized. For example direct network communication links may be contemplated between devices of different types, such as FPGA add-in cards, General Purpose Processing Units (GPUs), network interface devices, storage devices, and the like, as needed or desired.

Figure 4:
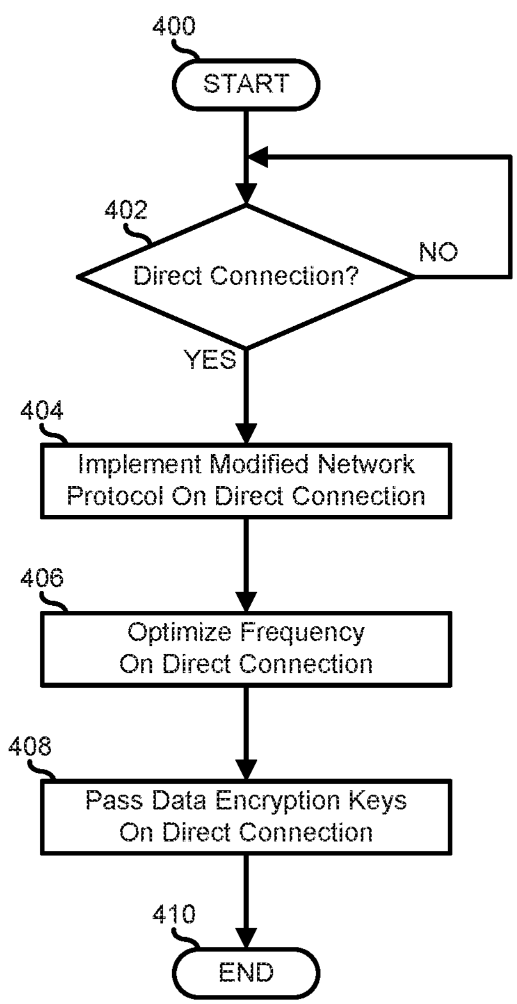
FIG. 4 is a flowchart illustrating a method for providing heterogenous protocols on network interface devices according to an embodiment of the present disclosure.

FIG. 4 illustrates a method for a method for providing heterogenous protocols on network interface devices, starting at block 400. In block 402, a decision is made as to whether or not a first add-in card with a network interface device detects that a direct network communication link has been established with a second device. For example, one of FPGA add-in cards 324 or 326 can determine that network communication link 328 has been established, and whether or not the network communication link is a direct network communication link by communicating with hosted environment 330 to determine the identities of the devices of information handling system 300 and matching the device identities with the identity of the other device connected via the network communication link. If the first add-in card detects that a direct network communication link has not been established with the second device, the "NO" branch of decision block 402 is taken and the method loops back to decision block 402 until the first add-in card detects that a direct network communication link has been established with the second device, at which time the "YES" branch of decision block 402 is taken and the method proceeds to block 404.

At block 404, the first add-in card operates to implement a modified network protocol for communications on the direct network communication link. For example, a modified Ethernet protocol can be implement that dispenses with some portion of the typical Ethernet protocol framing mechanism, or other modified protocols can be utilized that reduces the protocol overhead and increases the proportion of data transmitted via the direct network communication link. The operating frequency of the direct network communication link is optimized in block 406. For example, one of network interface devices 325 or 327 can direct the other network interface device to provide a loopback mode, such that the initiating network interface device can characterize the network communication link in terms of cable length, propagation delay, attenuation, and the like, to determine a highest operating frequency that can be achieved on the network communication link. Data encryption keys are passed on the direct network communication link in block 408. For example, a symmetric key encryption based upon a shared random number can be employed on the direct data communication link, or an asymmetric encryption scheme can be shared on the direct data communication link. The method ends in block 410.

Figure 5:
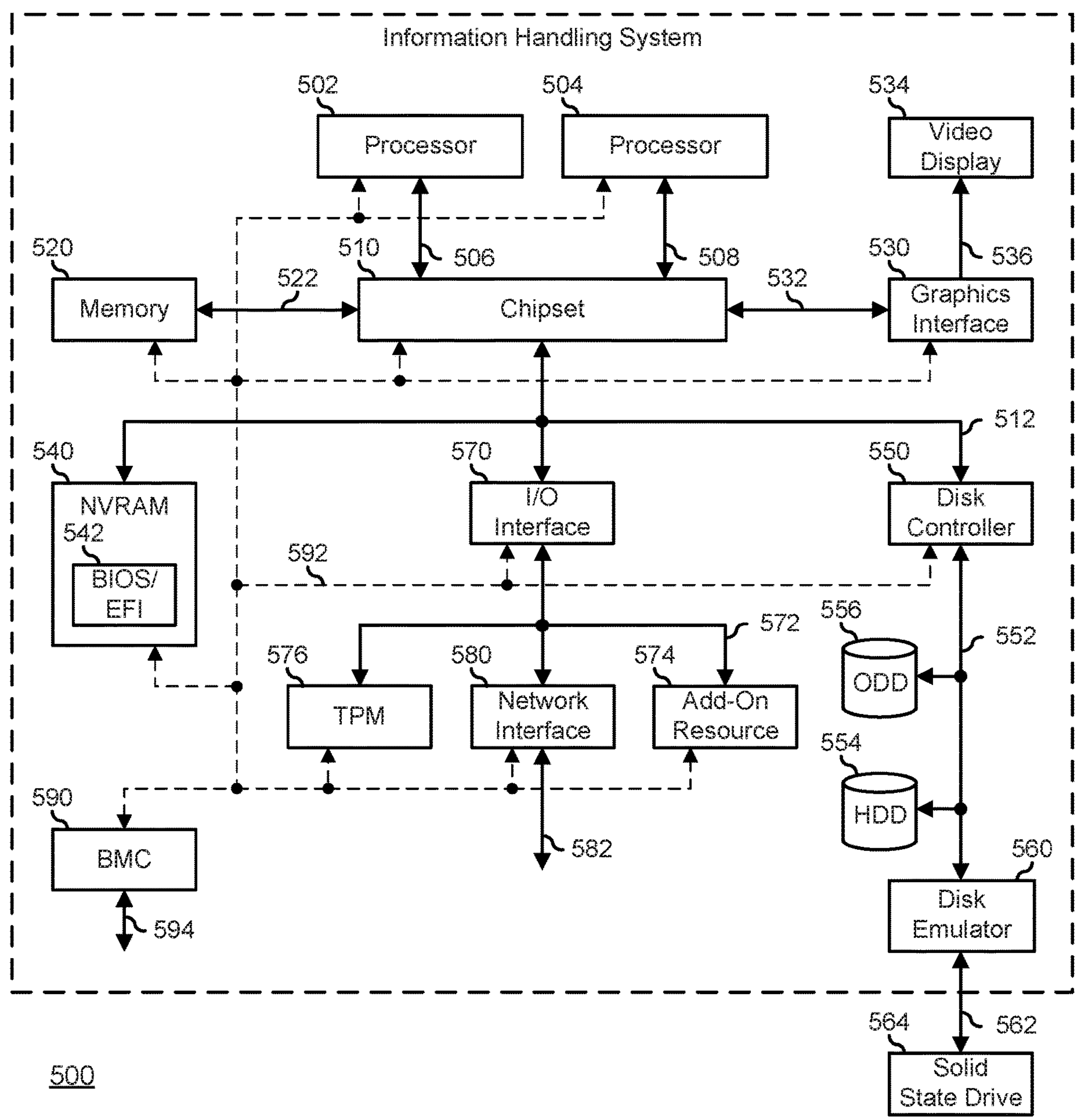
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 includes processors 502 and 504, a chipset 510, a memory 520, a graphics adapter 530 connected to a video display 534, a non-volatile RAM (NV-RAM) 540 that includes a basic input and output system/extensible firmware interface (BIOS/EFI) module 542, a disk controller 550, a hard disk drive (HDD) 554, an optical disk drive 556, a disk emulator 560 connected to a solid state drive (SSD) 564, an input/output (I/O) interface 570 connected to an add-on resource 574 and a trusted platform module (TPM 576, a network interface 580, and a baseboard management controller (BMC) 590. Processor 502 is connected to chipset 510 via processor interface 506, and processor 504 is connected to the chipset via processor interface 508. In a particular embodiment, processors 502 and 504 are connected together via a high-capacity coherent fabric, such as a HyperTransport link, a QuickPath Interconnect, or the like. Chipset 510 represents an integrated circuit or group of integrated circuits that manages the data flows between processors 502 and 504 and the other elements of information handling system 500. In a particular embodiment, chipset 510 represents a pair of integrated circuits, such as a northbridge component and a southbridge component. In another embodiment, some or all of the functions and features of chipset 510 are integrated with one or more of processors 502 and 504. Memory 520 is connected to chipset 510 via a memory interface 522. An example of memory interface 522 includes a Double Data Rate (DDR) memory channel and memory 520 represents one or more DDR Dual In-Line Memory Modules (DIMMs). In a particular embodiment, memory interface 522 represents two or more DDR channels. In another embodiment, one or more of processors 502 and 504 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 520 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 530 is connected to chipset 510 via a graphics interface 532, and provides a video display output 536 to a video display 534. An example of a graphics interface 532 includes a Peripheral Component Interconnect-Express (PCIe) interface and graphics adapter 530 can include a four lane (x4) PCIe adapter, an eight lane (x8) PCIe adapter, a 16-lane (x16) PCIe adapter, or another configuration, as needed or desired. In a particular embodiment, graphics adapter 530 is provided down on a system printed circuit board (PCB). Video display output 536 can include a Digital Video Interface (DVI), a High-Definition Multimedia Interface (HDMI), a DisplayPort interface, or the like, and video display 534 can include a monitor, a smart television, an embedded display such as a laptop computer display, or the like.

NV-RAM 540, disk controller 550, and I/O interface 570 are connected to chipset 510 via an I/O channel 512. An example of I/O channel 512 includes one or more point-to-point PCIe links between chipset 510 and each of NV-RAM 540, disk controller 550, and I/O interface 570. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 540 includes BIOS/EFI module 542 that stores machine-executable code (BIOS/EFI code) that operates to detect the resources of information handling system 500, to provide drivers for the resources, to initialize the resources, and to provide common access mechanisms for the resources. The functions and features of BIOS/EFI module 542 will be further described below.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive (SSD) 564 to be connected to information handling system 500 via an external interface 562. An example of external interface 562 includes a USB interface, a proprietary interface, or a combination thereof. Alternatively, solid-state drive 564 can be disposed within information handling system 500.

I/O interface 570 includes a peripheral interface 572 that connects the I/O interface to add-on resource 574, to TPM 576, and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a network communication device disposed within information handling system 500, on a main circuit board of the information handling system, integrated onto another component such as chipset 510, in another suitable location, or a combination thereof. Network interface device 580 includes a network channel 582 that provides an interface to devices that are external to information handling system 500. In a particular embodiment, network channel 582 is of a different type than peripheral channel 572 and network interface 580 translates information from a format suitable to the peripheral channel to a format suitable to external devices. In a particular embodiment, network interface 580 includes a network interface card (NIC) or host bus adapter (HBA), and an example of network channel 582 includes an InfiniBand channel, a Fibre Channel, a Gigabit Ethernet channel, a proprietary channel architecture, or a combination thereof. In another embodiment, network interface 580 includes a wireless communication interface, and network channel 582 includes a WiFi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 582 can be connected to an external network resource (not illustrated). The network resource can include another information handling system, a data storage system, another network, a grid management system, another suitable resource, or a combination thereof.

BMC 590 is connected to multiple elements of information handling system 500 via one or more management interface 592 to provide out of band monitoring, maintenance, and control of the elements of the information handling system. As such, BMC 590 represents a processing device different from processor 502 and processor 504, which provides various management functions for information handling system 500. For example, BMC 590 may be responsible for power management, cooling management, and the like. The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers.

Capabilities and functions provided by BMC 590 can vary considerably based on the type of information handling system. BMC 590 can operate in accordance with an Intelligent Platform Management Interface (IPMI). Examples of BMC 590 include an Integrated Dell Remote Access Controller (iDRAC). Management interface 592 represents one or more out-of-band communication interfaces between BMC 590 and the elements of information handling system 500, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 500, that is apart from the execution of code by processors 502 and 504 and procedures that are implemented on the information handling system in response to the executed code. BMC 590 operates to monitor and maintain system firmware, such as code stored in BIOS/EFI module 542, option ROMs for graphics interface 530, disk controller 550, add-on resource 574, network interface 580, or other elements of information handling system 500, as needed or desired. In particular, BMC 590 includes a network interface 594 that can be connected to a remote management system to receive firmware updates, as needed or desired. Here, BMC 590 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 590 utilizes various protocols and application programming interfaces (APIs) to direct and control the processes for monitoring and maintaining the system firmware. An example of a protocol or API for monitoring and maintaining the system firmware includes a graphical user interface (GUI) GUI associated with BMC 590, an interface defined by the Distributed Management Taskforce (DMTF) (such as a Web Services Management (WS-MAN) interface, a Management Component Transport Protocol (MCTP) or, a Redfish interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a “F2” boot option, or another protocol or API, as needed or desired.

In a particular embodiment, BMC 590 is included on a main circuit board (such as a baseboard, a motherboard, or any combination thereof) of information handling system 500, or is integrated onto another element of the information handling system such as chipset 510, or another suitable element, as needed or desired. As such, BMC 590 can be part of an integrated circuit or a chip set within information handling system 500. An example of BMC 590 includes an integrated Dell remote access controller (iDRAC), or the like. BMC 590 may operate on a separate power plane from other resources in information handling system 500. Thus BMC 590 can communicate with the management system via network interface 594 while the resources of information handling system 500 are powered off. Here, information can be sent from the management system to BMC 590 and the information can be stored in a RAM or NV-RAM associated with the BMC. Information stored in the RAM may be lost after power-down of the power plane for BMC 590, while information stored in the NV-RAM may be saved through a power-down/power-up cycle of the power plane for the BMC.

The preceding description in combination with the Figures is provided to assist in understanding the teachings disclosed herein. The preceding discussion focused on specific implementations and embodiments of the teachings. This focus has been provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:

a first add-in card including a first network interface device configured to communicate via a first network protocol; and a second add-in card including a second network interface device directly connected to the first network interface device via a network communication link and configured to communicate via the first network protocol;

wherein the first add-in card is configured to:

determine that the first network interface device is directly connected to the second network interfaced device via the network communication link;

direct that the first and second network interface devices communicate via a second network protocol based upon the first network interface device being directly connected to the second network interface device via the network communication link, wherein the second network protocol transmits a higher proportion of payload data as compared with framing data than the first network protocol;

direct the second network interface device to enter a loopback mode on the network communication link;

characterize the network communication link;

determine a highest operating frequency of the network communication link; and set an operating frequency of the network communication link to the highest operating frequency.

2. The information handling system of claim 1, wherein in determining that the first network interface device is directly connected to the second network interfaced device, the first network interface device is configured to:

determine an identification of the second add-in card via the connection to the second add-in card; and determine from a processor of the information handling system that the identification is associated with a device of the information handling system.

3. The information handling system of claim 2, wherein the identification includes at least one of a Media Access Control address and an Internet Protocol address.

4. The information handling system of claim 1, wherein the second network protocol comprises a version of the first network protocol with a reduced framing overhead.

5. The information handling system of claim 4, wherein the reduced framing overhead includes the elimination of a source address and a destination address from frames transmitted via the second network protocol.

6. The information handling system of claim 1, wherein the network communication link is characterized in terms of one of a cable length of the network communication link, a propagation delay on the network communication link, and an attenuation of a signal looped back on the network communication link.

7. The information handling system of claim 1, wherein the first add-in card is further configured to:
- provide a data encryption key to the second network interface device via the network communication link.

8. The information handling system of claim 7, wherein the data encryption key includes a randomly generated symmetric data encryption key.

9. The information handling system of claim 7, wherein the data encryption key includes an asymmetric data encryption key.

10. A method, comprising:
- directly connecting a first network interface device of a first add-in card of an information handling system to a second network interface device of a second add-in card of the information handling system, wherein the first and second network interface devices are configured to communicate via a first network protocol;
- determining, by the first add-in card, that the first network interface device is directly connected to the second network interfaced device via a network communication link;
- directing, by the first add-in card, that the first and second network interface devices communicate via a second network protocol based upon the first network interface device being directly connected to the second network interface device via the network communication link, wherein the second network protocol transmits a higher proportion of payload data as compared with framing data than the first network protocol;
- directing, by the first add-in card, the second network interface device to enter a loopback mode on the network communication link;
- characterizing, by the first add-in card, the network communication link;
- determining, by the first add-in card, a highest operating frequency of the network communication link; and
- setting, by the first add-in card, an operating frequency of the network communication link to the highest operating frequency.

11. The method of claim 10, wherein in determining that the first network interface device is directly connected to the second network interfaced device, the method further comprises:
- determining, by the first add-in card, an identification of the second add-in card via the connection to the second add-in card; and
- determining, by the first add-in card from a processor of the information handling system, that the identification is associated with a device of the information handling system.

12. The method of claim 11, wherein the identification includes at least one of a Media Access Control address and an Internet Protocol address.

13. The method of claim 10, wherein the second network protocol comprises a version of the first network protocol with a reduced framing overhead.

14. The method of claim 13, wherein the reduced framing overhead includes the elimination of a source address and a destination address from frames transmitted via the second network protocol.

15. The method of claim 10, wherein the network communication link is characterized in terms of one of a cable length of the network communication link, a propagation delay on the network communication link, and an attenuation of a signal looped back on the network communication link.

16. The method of claim 10, further comprising:
- providing, by the first add-in card, a data encryption key to the second network interface device via the network communication link.

17. The method of claim 16, wherein the data encryption key includes one of a randomly generated symmetric data encryption key and an asymmetric data encryption key.

18. An information handling system, comprising:
- a processor;
- a first add-in card including a first network interface device configured to communicate via a first network protocol; and
- a second add-in card including a second network interface device directly connected to the first network interface device via a network communication link and configured to communicate via the first network protocol;
- wherein the first add-in card is configured to:
  - determine that the first network interface device is directly connected to the second network interfaced device via the network communication link;
  - direct that the first and second network interface devices communicate via a second network protocol if the first network interface device is directly connected to the second network interface device via the network communication link, wherein the second network protocol transmits a higher proportion of payload data as compared with framing data than the first network protocol;
  - direct the second network interface device to enter a loopback mode on the network communication link;
  - characterize the network communication link;
  - determine a highest operating frequency of the network communication link; and
  - set an operating frequency of the network communication link to the highest operating frequency.

* * * * *